(12) United States Patent
Meyer (10) Patent No.: US 8,305,021 B2
(45) Date of Patent: Nov. 6, 2012

(54) DUAL PURPOSE PERMANENT MAGNET SPEED SENSOR AND GENERATOR

(75) Inventor: Steven D. Meyer, Snohomish, WA (US)

(73) Assignee: Astronics Advanced Electronic Systems Corp., Redmond, WA (US)

( * ) Notice: Subject to any disclaimer, the term of this patent is extended or adjusted under 35 U.S.C. 154(b) by 412 days.

(21) Appl. No.: 12/637,832

(22) Filed: Dec. 15, 2009

(65) Prior Publication Data

US 2011/0140645 A1    Jun. 16, 2011

(51) Int. Cl.
*H02K 29/14* (2006.01)
(52) U.S. Cl. ........... 318/400.3; 318/400.37; 318/400.38; 318/400.39; 318/400.41; 322/12; 322/13; 322/14; 322/29; 323/250
(58) Field of Classification Search ............... 318/400.3, 318/400.37, 400.38, 400.39, 400.41, 452, 318/142, 453; 322/12, 13, 14, 29; 323/250
See application file for complete search history.

(56) References Cited

U.S. PATENT DOCUMENTS

| | | | | |
|---|---|---|---|---|
| 5,239,251 A * | 8/1993 | Lauw | ........................... | 318/767 |
| 5,512,811 A * | 4/1996 | Latos et al. | ..................... | 322/10 |
| 5,798,631 A * | 8/1998 | Spee et al. | ....................... | 322/25 |
| 5,892,342 A * | 4/1999 | Friedlander et al. | .......... | 318/434 |
| 6,118,186 A * | 9/2000 | Scott et al. | .................. | 290/40 B |
| 6,800,953 B2 | 10/2004 | Blackburn et al. | | |
| 7,256,563 B2 | 8/2007 | Kuehner et al. | | |
| 8,102,143 B2 * | 1/2012 | Weigel | ........................ | 318/801 |
| 2009/0102468 A1 | 4/2009 | Takahashi | | |
| 2009/0230927 A1 | 9/2009 | Patterson | | |

OTHER PUBLICATIONS

Burrow, S.G. et al., "Sensorless operation of a permanent-magnet generator for aircraft," IEEE Transactions on Industry Applications, 2008, vol. 44, No. 1, pp. 101-107.
O'Gorman, T., "Sensorless control of a permanent magnet machine/ gasoline engine using an extended Kalman filter," IEEE Industry Applications Society Annual Meeting 1996.
Mellor, P.N. et al., "A wide-speed-range hybrid . . . generator . . . ," IEEE Transactions on Industry Applications, 2005, vol. 41, No. 2, pp. 551-556.

* cited by examiner

*Primary Examiner* — Rita Leykin
(74) *Attorney, Agent, or Firm* — Wiggin and Dana LLP (57) ABSTRACT

An apparatus is disclosed for simultaneously measuring the rotational speed and/or direction of a shaft, and providing control power in accordance with the shaft rotation. The apparatus includes a permanent magnet machine (PMM) having a multipole rotor and a stator. The rotor has a plurality of permanent magnet poles and connection to the rotating shaft; the stator includes a winding and electrical connections, so that motion of the rotor with respect to the stator causes a voltage signal at the electrical connections. The apparatus also includes a circuit including a power conversion portion and a speed/direction sensing portion. The circuit receives the voltage signal from the PMM, and simultaneously outputs control power from the power conversion portion and a signal indicating the rotational speed and/or direction of the shaft from the sensing portion.

20 Claims, 6 Drawing Sheets

DUAL PURPOSE PERMANENT MAGNET SPEED SENSOR AND GENERATOR

FIELD OF THE DISCLOSURE

This disclosure relates to shaft speed sensors and starter/generator systems suitable for use in aircraft or automobiles, and more particularly to induction machines used in such systems.

BACKGROUND OF THE DISCLOSURE

In starter/generator systems (for example, in aircraft), it is highly desirable to use a machine where the excitation can be removed, to safely shut off operation of the generator function and thus prevent excess heat in failures or smoke generation. Removing excitation from the machine provides a positive shut-off of electrical power dissipation without the need to shut down the prime mover engine that also is used for propulsion.

A DC brushed machine is often used for this application, due to its ability to act as a motor or generator with minimal control electronics and its ability to remove most of the field excitation by reducing the field winding current to zero. Alternatively, an induction machine may be used. An induction machine has the advantage of low cost and does not employ brushes. In addition, it can control the excitation to ensure safety and maximize utilization of the interfacing power electronics.

The ability to remove excitation is also a disadvantage in that it is also highly desirable to be able to initiate generation with no external power source other than shaft power, so that each generator is failure independent of another. In addition, when an induction machine is used for a motor or a generator, a speed reference signal is often needed to provide control.

Accordingly, it is desirable to implement a combined sensor and power source which provides both the needed speed sensing and control power to allow an induction machine generation system to initiate generation with no external power input.

SUMMARY OF THE DISCLOSURE

In accordance with the disclosure, a single small permanent magnet machine (PMM) simultaneously operates both as a speed sensor and as a source of control power. The permanent magnets provide magnetic field without any outside applied current. Mechanical rotation (for example, rotation of an engine shaft) causes a changing magnetic field, which induces a voltage in the machine. Since the sensor is small and the control power is low, permanent excitation (such as permanent coupling of the PMM to the engine shaft) is not a significant safety issue as is encountered when using a PMM for high power. The sensor/power source may be advantageously used with an induction machine, especially where the induction machine is used as a generator and power is not available to initiate generation.

According to an aspect of the disclosure, an apparatus is provided for simultaneously outputting a speed signal indicating the rotational speed of a shaft and control power for controlling another machine. The apparatus includes a permanent magnet machine (PMM) having a multipole rotor and a stator. The rotor has a plurality of permanent magnet poles and a connector for connection to the rotating shaft; the stator includes a winding and electrical connections, so that motion of the rotor with respect to the stator causes a voltage signal at the electrical connections. The apparatus also includes a circuit including a power conversion portion and a speed sensing portion. The circuit receives the voltage signal from the PMM, and simultaneously outputs control power from the power conversion portion and a speed signal indicating a rotational speed of the shaft from the speed sensing portion. In specific embodiments, the speed sensing portion includes a zero crossing detector, and the PMM voltage signal has two phases shifted by 90 degrees relative to each other; each phase may be rectified using a separate rectifier circuit, with the outputs of the rectifier circuits connected to a DC power bus. A switching device may be included on the DC power bus.

According to another aspect of the disclosure, a method includes the steps of providing a permanent magnet machine (PMM) coupled to a rotatable shaft; generating a voltage signal using the PMM, in accordance with a rotational speed of the shaft; and simultaneously generating from the voltage signal a speed signal indicating the rotational speed of the shaft and control power; the control power is effective to control a machine requiring external excitation for generation.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

Figure 1:
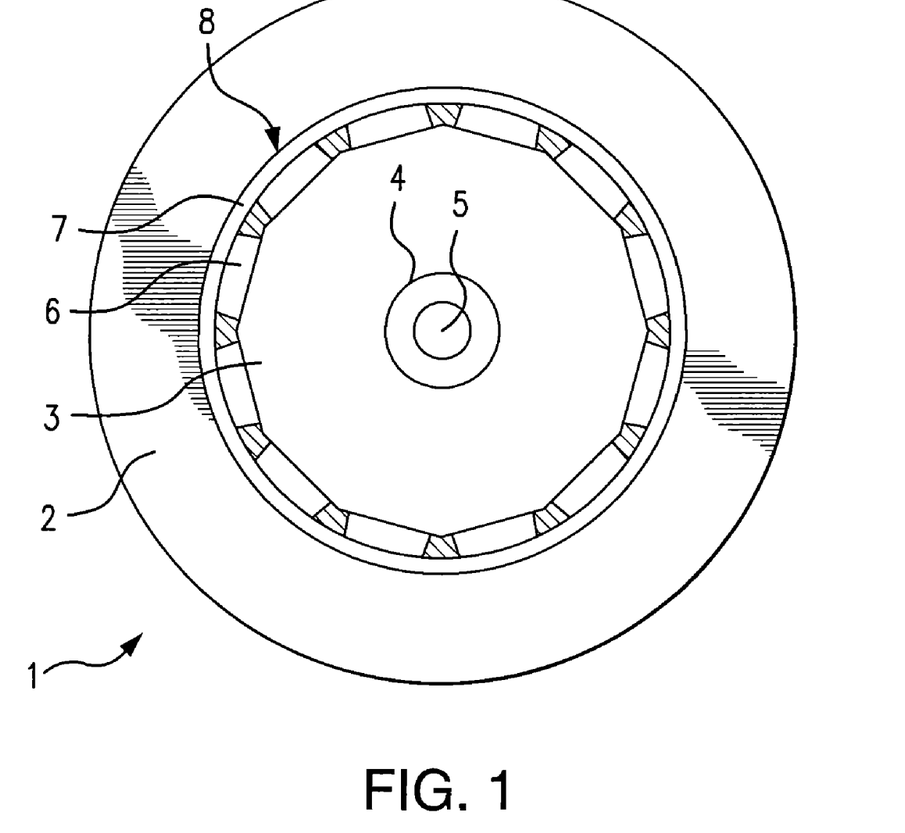
FIG. 1 illustrates a permanent magnet machine (PMM) having a 12-pole permanent magnet rotor installed in a stator, according to an embodiment of the disclosure.

A PMM configuration according to an embodiment of the disclosure includes a permanent magnet rotor that generates a rotating magnetic field and a stator assembly that produces an alternating current (AC) output voltage proportional in amplitude and frequency to the rate of change of the magnetic field generated by the rotor. FIG. 1 illustrates a rotor/stator assembly 1 including stator 2 and rotor 3. The rotor has a central fitting 4 with an opening 5 for receiving a drive shaft perpendicular to the plane of the drawing. As shown in FIG. 1, the rotor has twelve pole pieces 6, with six sets of permanent magnets. The pole pieces are held in place by a retaining ring 7, which is separated from the stator by an air gap 8. Stator 2 has a twelve-pole winding. Increasing the number of magnetic poles offers an advantage in sensor performance, since an increased number of poles allows better resolution in timing at low shaft speeds. Assembly 1 is capable of about 72 V peak output voltage at 12,000 RPM. In this embodiment, the stator winding is two-phase, in order to provide two independent and redundant speed output signals. The two signals are shifted in phase by 90 degrees and are rectified for the generation of control power.

In general, the electrical output of assembly 1 permits a direct measurement of the shaft rotational speed and direction. The PMM can be implemented with a dual-phase or multi-phase output of various pole/winding configurations as long as the output of the PMM is proportional in frequency to the speed of the rotor's drive shaft. In other embodiments, the PMM may be designed to support a large number of proportionality relationships for shaft speed to PMM output voltage and/or frequency.

Figure 2:
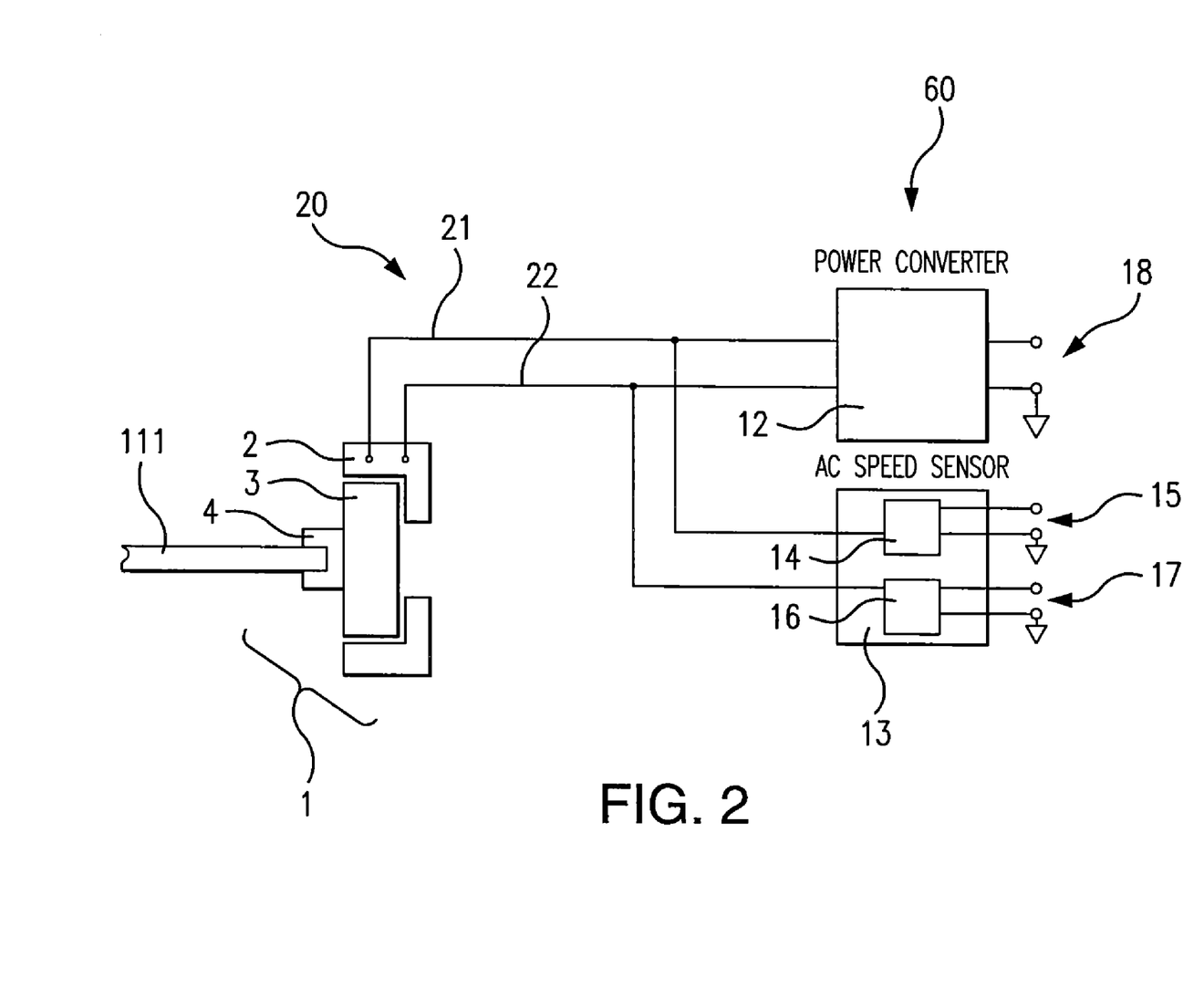
FIG. 2 is a block diagram illustrating an embodiment in which the PMM of FIG. 1 is configured as a dual purpose shaft speed sensor and power converter.

FIG. 2 illustrates a dual-mode permanent magnet speed sensor and power converter, according to an embodiment of the disclosure. The PMM rotor/stator assembly 1 is powered by rotating shaft 111, which turns rotor 3 relative to stator 2; in this embodiment there are two output signals 21, 22 corresponding to the two-phase stator winding. Mechanical power from shaft 111 is converted to electrical DC power by power converter 12. The PMM output is simultaneously used to obtain an AC signal corresponding to the rotation speed of shaft 111. Each of the output signals from the PMM is fed into a power converter 12 and AC speed sensor 13. Power converter 12 outputs DC power 18 for operating another unit (e.g. drive electronics unit 170, an induction machine, control equipment, etc.). In this embodiment, the AC speed sensor 13 includes sensor circuits 14, 16 for each of the two phases, to produce the two separate and redundant rotation speed signals 15, 17.

The output impedance of the PMM can also be designed for high reactance to provide self protection from overloads or shorted wires, or low reactance to maximize electrical efficiency and minimize size and weight.

Figure 3:
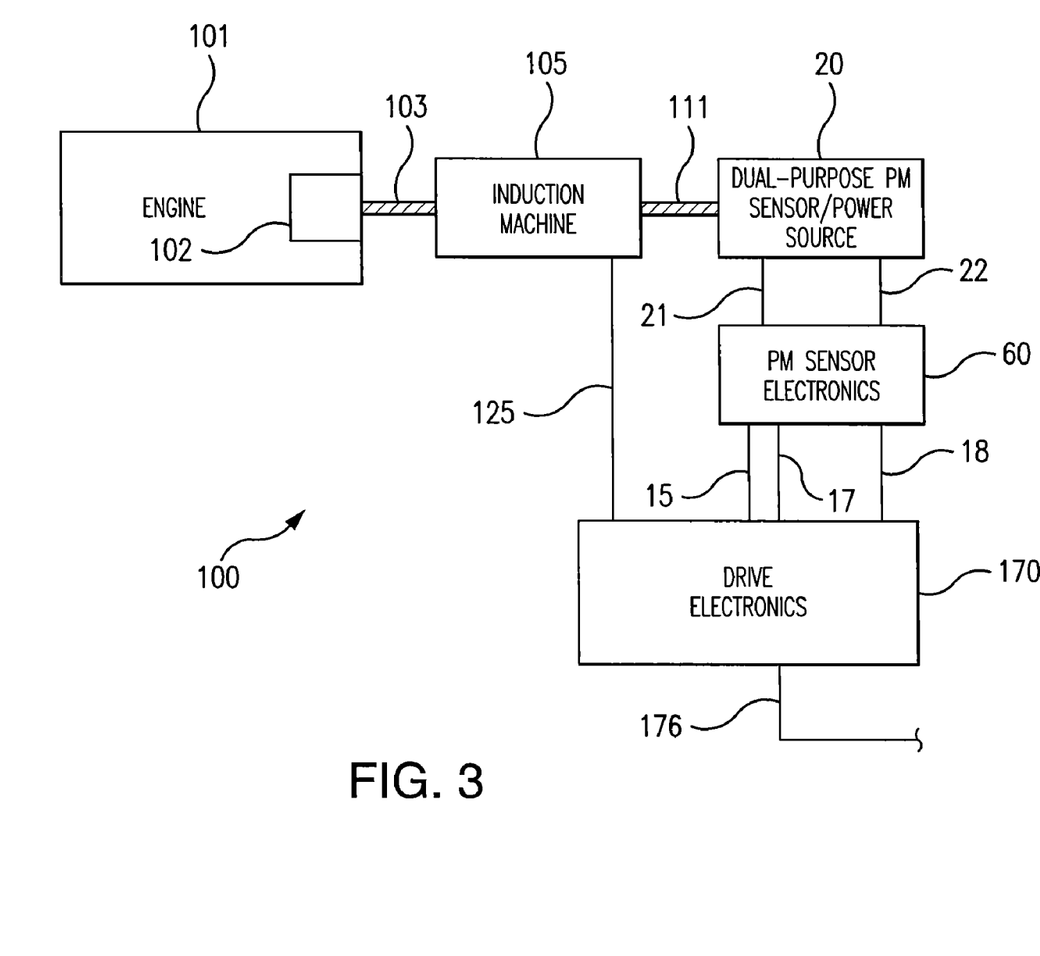
FIG. 3 is a block diagram of a system including the dual purpose shaft speed sensor and power converter of FIG. 2.

FIG. 3 illustrates a system 100 in which an engine is connected via a drive shaft to an induction machine and to a dual-purpose permanent magnet (PM) speed sensor and power converter, according to an embodiment of the disclosure. In this embodiment, engine 101 (e.g. an aircraft engine) including an auxiliary gearbox 102 drives an induction machine 105 (e.g. a brushless starter/generator) by shaft 103. The induction machine has a power connection 125 to a drive electronics unit 170, which is connected to a power bus 176. Mechanical power is delivered via shaft 111 to the dual-purpose PM sensor/power source 20. Outputs 21, 22 from sensor/power source 20 are connected to PM sensor electronics unit 60, which serves as an interface between sensor/power source 20 and the drive electronics unit 170. In this embodiment, electronics unit 60 delivers two redundant speed signals 15, 17 to the electronics unit 170, and also outputs control power 18 to the drive electronics unit. Drive electronics unit 170 is connected to power bus 176 (for example, 28 VDC). Power from the power bus is input to electronics unit 170, and then to induction machine 105, for starting engine 101; power is output to the power bus when induction machine 105 operates as a generator.

Figure 4:
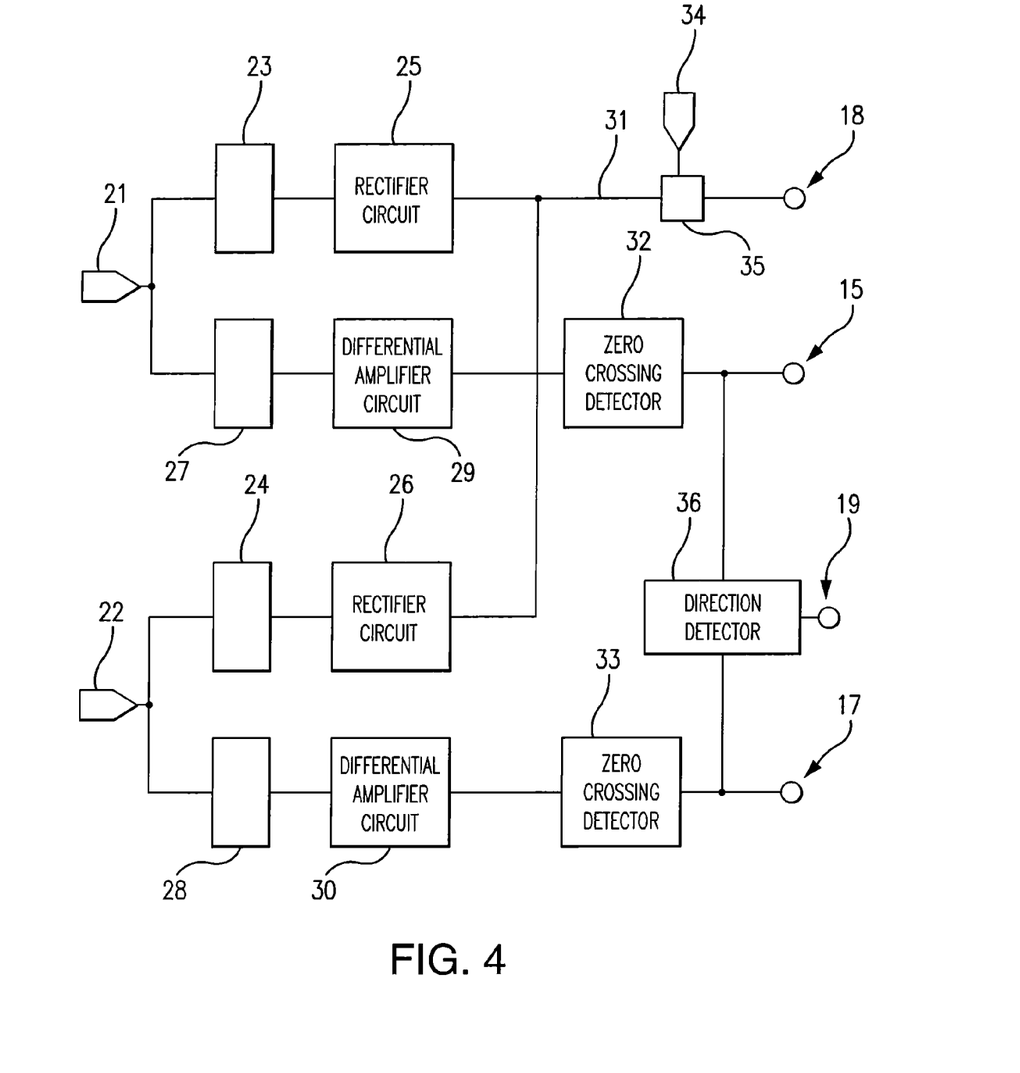
FIG. 4 is a block diagram of a combined AC sensor circuit and DC control power generation circuit connected to a PMM, according to an embodiment of the disclosure.

A block diagram showing details of electronics unit 60 according to an embodiment, including an AC rotation speed/direction sensor and a power converter, is shown in FIG. 4.

AC Rotation Speed/Direction Sensor

In this embodiment, a zero crossing detection method is used to measure the rotation speed and direction of shaft 111. Differential amplifiers 29, 30 with filters 27, 28 are used to measure the differential voltage across each of the two sensor windings. The outputs of amplifiers 29, 30 are input to zero crossing detectors 32, 33 respectively. Signals from the zero crossing detectors 32, 33 are transferred to outputs 15, 17. Voltage signals at 15 and 17 relative to ground (the same ground as for the vehicle control unit) thus may be used to determine rotation speed and direction, as described in more detail below.

The amplifier frequency response is used to optimize the low speed signal amplitude and compensate for the increasing sensor output voltage with increasing shaft speed. Comparators with hysteresis are used to provide noise immunity in the zero cross detectors 32, 33. The time between zero crossings is used to measure the period T of the sensor output voltage signal; the signal frequency Freq=1/T. The shaft speed in RPM is then Freq*60/N, where N is the number of sensor pole pairs (6 for the PMM shown in FIG. 1) and 60 is the conversion factor from seconds to minutes.

The signal period T may be measured by two methods, suitable for low and high rotation speeds respectively. At low speed, the period may be expressed as a multiple of a control cycle time Tc; the number Y of control cycles between successive sensor zero crossings is counted, and the period T is then T=TcY. This method gives acceptable resolution provided that the period T is long compared to Tc. At higher speeds, when T approximates Tc, the resolution is too coarse for an accurate rotation speed measurement. In a further embodiment, a processor capture module is used at higher rotation speeds to measure the period T. The capture module is a hardware counter timer included in a processor as part of the vehicle control unit. Typically the processor has a 16-bit counter that will overflow if used at low speeds.

As shown in FIG. 4, in this embodiment independent speed sensing is provided for each of the two stator windings with independent outputs 15, 17, for an increased level of fault tolerance.

Figure 5A:
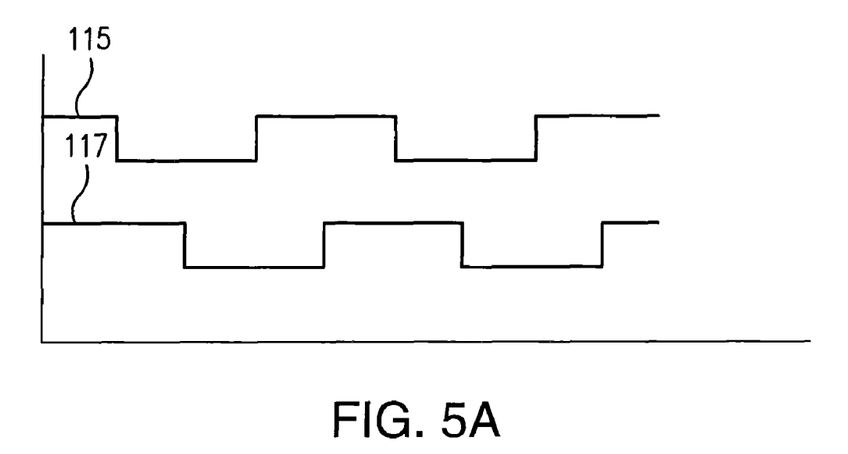
FIGS. 5A and 5B illustrate output waveforms from the circuit of FIG. 4, showing how direction of rotation may be sensed in the forward and reverse directions respectively.
Figure 5B:
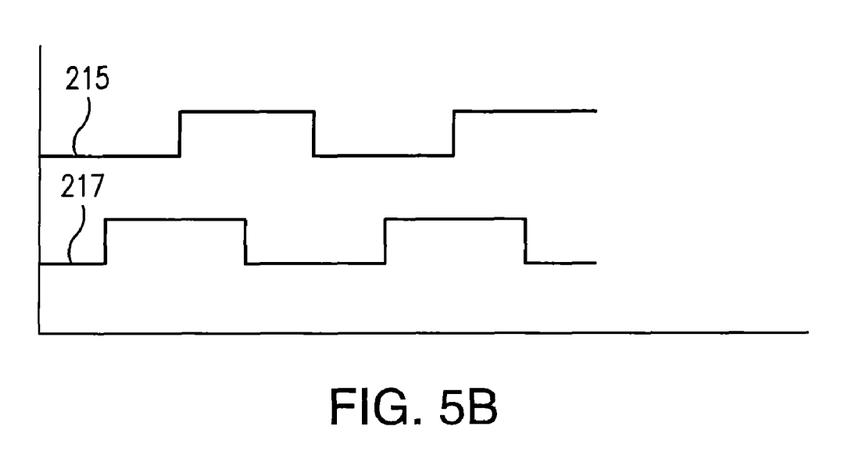

In applications where the rotation direction must be sensed in addition to the rotation speed, the two independent outputs 15, 17 are coupled to direction detector 36. In detector 36, one of the outputs 15, 17 is used as a reference and is compared with the other output. The waveforms 115, 117 of the two outputs in one rotation direction (defined here as forward) are shown in FIG. 5A; the waveforms 215, 217 of the two outputs when rotation is in the other direction (reverse) are shown in FIG. 5B. Waveform 115 has a rising edge while 117 is low; waveform 215 has a rising edge while 217 is high. The result of comparing 15 and 17, sampled just after a rising edge in output 15, thus can indicate the rotation direction; a direction signal is output at 19. In this embodiment, rotation direction sensing depends on the phasing of assembly 1; accordingly, changing the phasing changes the apparent direction of rotation. The comparator function for rotation direction can be performed using either hardware or software.

Power Conversion to DC

The voltage signals 21, 22 from the two output phases of the PMM are rectified to create a DC power output 18. Each of the rectifier circuits 25, 26 has a full wave rectifier with four diodes. As shown in FIG. 4, the rectified outputs are combined and connected to a power bus 31.

The PMM preferably has high enough output inductance to limit the short circuit current to a low enough level to prevent wiring damage in the event of a short circuit. To increase the output power capability of the PMM, resonant capacitor circuits 23, 24 are used to cancel out the inductive reactance of the PMM. A short beyond the resonant capacitor will cause high currents; a fuse is therefore preferably connected to circuits 23, 24 to protect against this failure mode.

In this embodiment, a switch 35 is used to connect the output of the power converter 12 to the load, in accordance with an external control signal 34.

Sensor/Power Converter Combined Circuit

Figure 6:
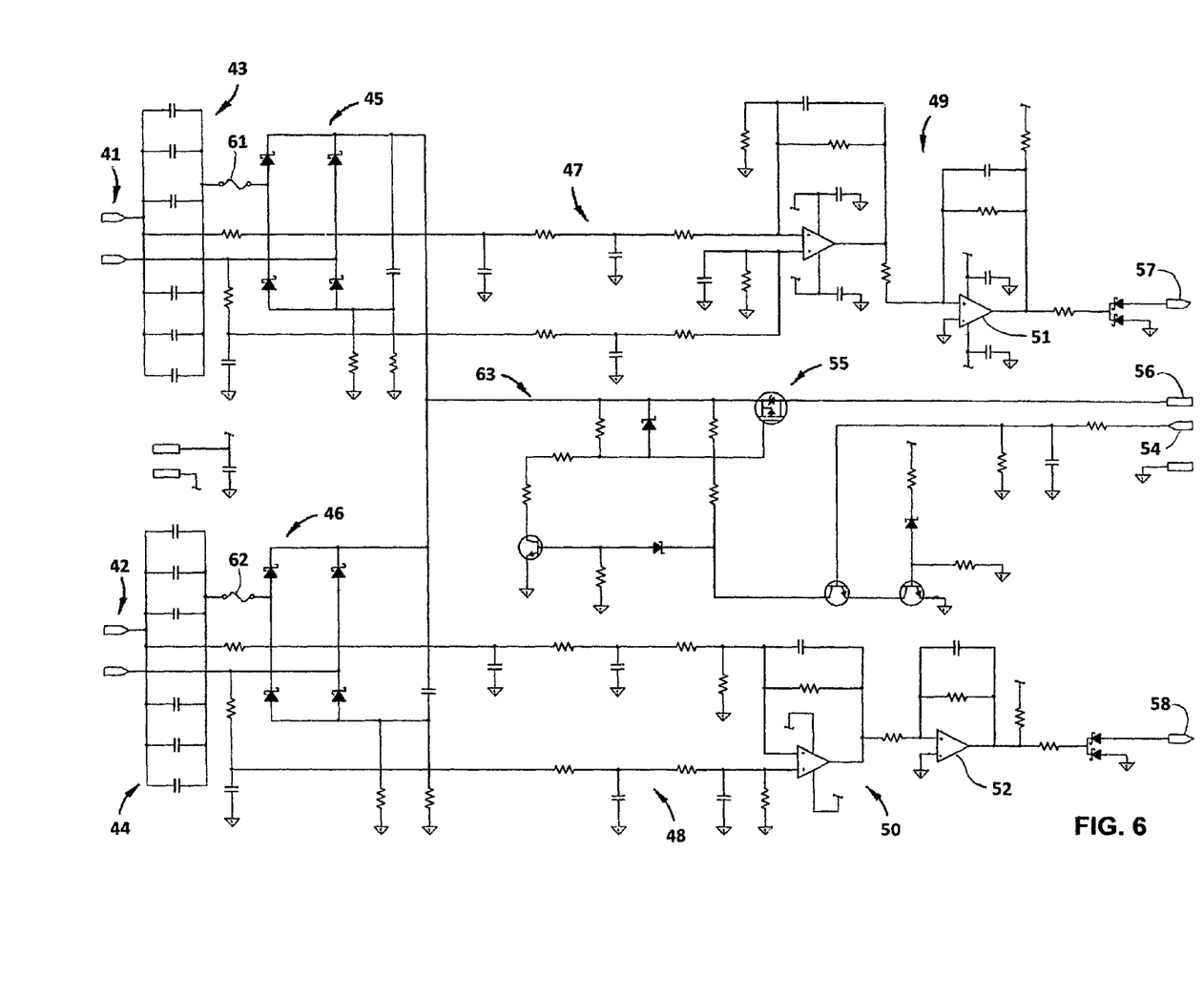
FIG. 6 is a circuit diagram illustrating an embodiment of the combined circuit of FIG. 4.

A schematic diagram of a circuit according to the above-described embodiment, suitable for an aircraft application, is shown in FIG. 6. This circuit has a rotation speed sensing portion with redundant outputs and a power conversion portion with a switched DC power output.

Independent inputs 41, 42 are 90 degrees out of phase, corresponding to the two phases of the stator windings of the PMM. As noted above, the PMM preferably has high series inductance that provides a current limiting function to protect the aircraft wiring from shorts. To allow higher power transfer, the power portion includes capacitor circuits 43, 44 (sets of parallel capacitors) that resonate with the leakage inductance allowing higher power transfer than the leakage inductance would otherwise allow. Capacitor circuits 43, 44 are connected to rectifier circuits 45, 46 through fuses 61, 62.

The outputs of the rectifier circuits 45, 46 feed the DC power bus 63. A switching circuit, including MOSFET 55 and controlled by switching signal 54, is used to disconnect the power from output terminal 56. This is useful when the control equipment is intended to be powered from other sources.

In the speed sensor portion, the inputs 41, 42 are connected to filters 47, 48 and amplified with differential amplifiers 49, 50. The filter and differential amplifier provide controlled gain over the speed range. The frequency of output voltages 57, 58 are directly proportional to the shaft rotation speed and the corresponding frequency of the signals 21, 22 from the PMM. By having high gain at low frequencies it is possible to have maximum performance at low speeds where the sensor output is low. At high frequencies the filtering can roll off the voltage to achieve better noise immunity. The speed sensor portion in FIG. 6 is able to detect rotation speeds from about 70 RPM up to the maximum speed required of 14,000 RPM. Comparators 51, 52 are used to sense the zero crossing of the conditioned signals. Hysteresis is used to reduce sensitivity to noise corruption. The rotation speed is determined by measuring the period of the comparator output signal, with the electrical frequency being equal to 1/period. To convert to a shaft rotation speed in RPM the frequency is multiplied by 60/N, where N is the number of pole pairs in the sensor (6 for a 12 pole sensor).

Application to Induction Machines

As noted above, the PMM and combined circuit may be advantageously connected to an induction machine, such as a brushless starter/generator. The PMM is small enough so that it may have permanent excitation (for example, permanent mechanical connection between shaft 111 and rotor 3) without raising safety concerns. At the same time, the power output is effective to excite an induction machine and/or provide control power to a drive electronics unit. In the embodiments described above, the power output is typically in the range of about 30 W to about 70 W.

Vector Control

In applications where the PMM and combined circuit are connected to an induction machine, vector control may be advantageously used for starting control of the induction machine, as is understood by those skilled in the art. Since the above-described speed sensor is not able to provide a true speed signal below about 70 RPM, an input representing a fictitious speed is supplied when the true shaft speed below 70 RPM; the supplied input is ramped up with time. This is done to ensure that the vector control "slip" (proportional to the Iq command divided by the Id command) is high enough in this mode to avoid machine saturation. Too low a slip causes torque producing currents to be steered into magnetization, causing saturation of the motor steel. As the shaft speed increases past the point where a valid speed sensing signal is available, the control switches to using the actual speed signal from the PMM speed sensing circuit.

A single PMM/sensor device, configured with circuits as described above, may provide both control power and a speed signal. This arrangement is especially useful for an induction machine but is applicable to other rotating machines such as a switched reluctance machine. The PMM/sensor is rugged and will work in extreme environments. This sensor is also less expensive and has been shown to provide superior performance compared to a resolver which calculates speed from shaft position change information.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. An apparatus comprising:
a permanent magnet machine (PMM) including
 a multipole rotor having a plurality of permanent magnet poles and a connector for connection to a rotating shaft, and
 a stator including a winding and electrical connections, so that motion of the rotor with respect to the stator causes a voltage signal at the electrical connections;
a circuit for receiving said voltage signal and simultaneously outputting control power and a speed sensing signal, said circuit including
 a power conversion portion for outputting the control power, and
 a sensing portion for outputting the speed sensing signal, said speed sensing signal indicating a rotational speed of the shaft; and
an induction machine connected to the rotating shaft.

2. An apparatus according to claim 1, wherein
the stator has a plurality of windings each having a separate set of connections, so that said voltage signal is a multiphase AC signal, and
the sensing portion is configured to output a separate speed signal corresponding to each phase of said multiphase AC signal.

3. An apparatus according to claim 1, wherein the power conversion portion includes a rectifier circuit.

4. An apparatus according to claim 2, wherein the power conversion portion includes a rectifier circuit for each phase of the multiphase AC signal, and further comprising a DC power bus for connection to an output of each of the rectifier circuits.

5. An apparatus according to claim 4, further comprising a switching device for interrupting power on the DC power bus.

6. An apparatus according to claim 1, wherein the speed sensing portion includes a zero crossing detector for measuring the rotational period of the shaft.

7. An apparatus according to claim 6, wherein the speed sensing portion further includes a filter circuit and a differential amplifier, and the zero crossing detector includes a comparator.

8. An apparatus according to claim 3, wherein the PMM has a leakage inductance, and the power conversion portion includes a capacitance connected between the rectifier circuit and said electrical connections.

9. An apparatus according to claim 2, wherein the sensing portion is configured to output a plurality of speed signals and to compare at least two speed signals to output a rotational direction signal.

10. An apparatus according to claim 2, wherein the stator has two windings so that the voltage signal has two phases, the two phases being shifted in phase by 90 degrees relative to each other.

11. An apparatus according to claim 1, wherein the control power is in the range of about 30 W to about 70 W.

12. An apparatus according to claim 1, wherein the speed sensor is effective to measure the rotational speed of the shaft in the range from about 70 RPM to about 14,000 RPM.

13. A method comprising the steps of:
providing a permanent magnet machine (PMM) coupled to a rotatable shaft;
generating a voltage signal using the PMM, in accordance with a rotational speed of the shaft;
simultaneously generating from the voltage signal a sensing signal and control power, the sensing signal indicating at least one of the rotational speed of the shaft and a rotational direction of the shaft, the control power being effective to control a machine requiring external excitation for generation,
wherein
said step of generating a voltage signal further comprises generating a multiphase AC signal, and
said step of simultaneously generating a DC voltage and a speed signal further comprises
rectifying each phase of the multiphase AC signal using a separate rectifier circuit for each phase, and
providing a DC power bus for connection to an output of each of the rectifier circuits.

14. A method according to claim 13, further comprising providing a switch on the DC power bus for interrupting power on the DC power bus in response to a switching signal.

15. A method according to claim 13, wherein said step of simultaneously generating a sensing signal and control power further comprises measuring the rotational speed of the shaft using a separate zero crossing detector for each phase.

16. A method according to claim 15, further comprising providing to each zero crossing detector an input representing a fictitious speed when the rotational speed of the shaft is below a lower limit of a speed sensing range, said lower limit being about 70 RPM.

17. A method according to claim 13, further comprising connecting drive electronics to the DC power bus to receive the control power, and wherein the control power is in the range of about 30 W to about 70 W.

18. A method according to claim 13, wherein the voltage signal has two phases, the two phases being shifted in phase by 90 degrees relative to each other.

19. An apparatus comprising:
a permanent magnet machine (PMM) including
a multipole rotor having a plurality of permanent magnet poles and a connector for connection to a rotating shaft, and
a stator including a winding and electrical connections, so that motion of the rotor with respect to the stator causes a voltage signal at the electrical connections;
a circuit for receiving said voltage signal and simultaneously outputting control power and a sensing signal, said circuit including
a power conversion portion for outputting the control power, the control power being effective to control a machine requiring external excitation for generation, and
a sensing portion for outputting the sensing signal, said sensing signal indicating at least one of a rotational speed of the shaft and a rotational direction of the shaft,
wherein
the stator has a plurality of windings each having a separate set of connections, so that said voltage signal is a multiphase AC signal,
the sensing portion is configured to output a separate speed signal corresponding to each phase of said multiphase AC signal, and
the power conversion portion includes a rectifier circuit for each phase of the multiphase AC signal, and further includes a DC power bus for connection to an output of each of the rectifier circuits.

20. An apparatus according to claim 19, wherein the speed sensing portion includes a zero crossing detector for measuring the rotational period of the shaft.

* * * * *